United States Patent [19]

Rutten et al.

[11] 4,043,465

[45] Aug. 23, 1977

[54] SILO DOOR CONSTRUCTION AND DISCHARGE CHUTE POSITIONING APPARATUS

[75] Inventors: James B. Rutten; Peter T. Rutten, both of Plainfield; Gordon G. Therrien, Oswego; Richard S. Gaylord, Plainfield, all of Ill.

[73] Assignee: Railoc Company, Inc., Plainfield, Ill.

[21] Appl. No.: 582,135

[22] Filed: May 30, 1975

[51] Int. Cl.² ............................................. B65G 65/38
[52] U.S. Cl. ................................ 214/17 DB; 49/464; 49/465; 52/196
[58] Field of Search ..................... 214/17 DB; 302/56; 49/463, 464, 465, 505; 52/192, 193, 195, 196, 212, 211

[56] References Cited

U.S. PATENT DOCUMENTS

| | | | |
|---|---|---|---|
| 1,286,300 | 12/1918 | Hames | 52/193 |
| 1,311,366 | 7/1919 | Wiederholdt | 52/196 |
| 1,380,831 | 6/1921 | Nelson et al. | 49/464 |
| 3,048,946 | 8/1962 | Hawk et al. | 52/196 |
| 3,248,833 | 5/1966 | Sklar | 52/211 |
| 3,698,575 | 10/1972 | Koser | 214/17 DB |

FOREIGN PATENT DOCUMENTS 228,714  8/1963  Austria .................................. 302/56

Primary Examiner—Trygve M. Blix
Assistant Examiner—Charles E. Frankfort
Attorney, Agent, or Firm—Olson, Trexler, Wolters, Bushnell & Fosse, Ltd.

[57] ABSTRACT

There is disclosed a silo door system designed to adapt older silo constructions for automated unloading, or to be employed as a general door system, if desired. The system includes a number of apertured panel sections clamped to the silo wall in aligned relationship, with door members for selectively closing said apertures. In addition, there is disclosed a double arm unloader chute positioning apparatus for maintaining alignment of an unloader discharge chute with the apertures in the panel sections.

7 Claims, 11 Drawing Figures

U.S. Patent  Aug. 23, 1977  Sheet 1 of 4  4,043,465
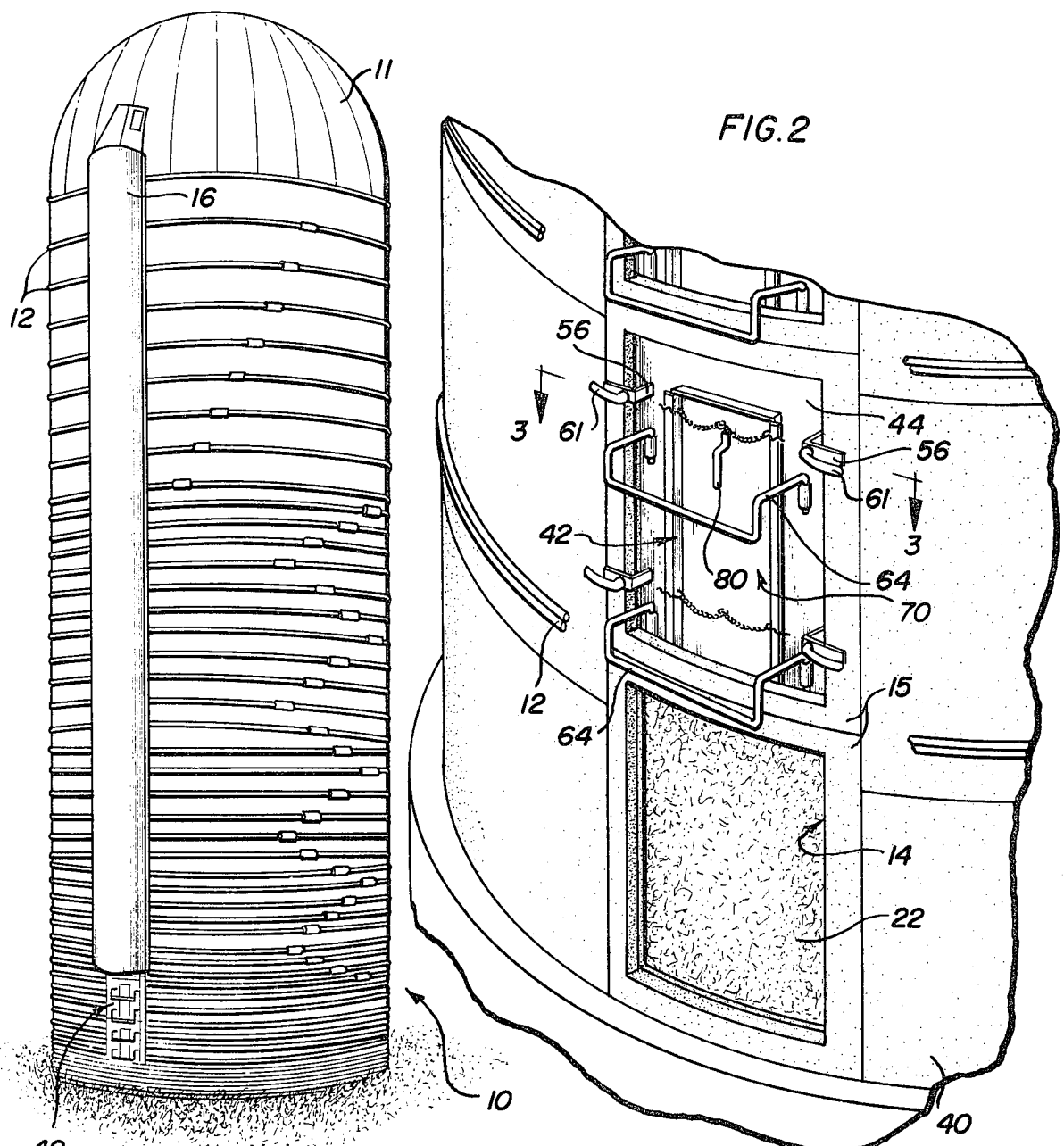

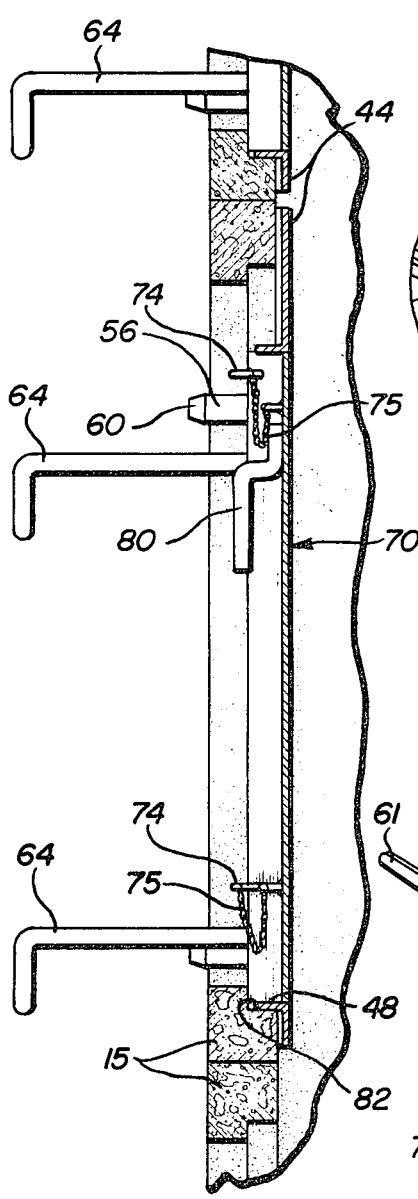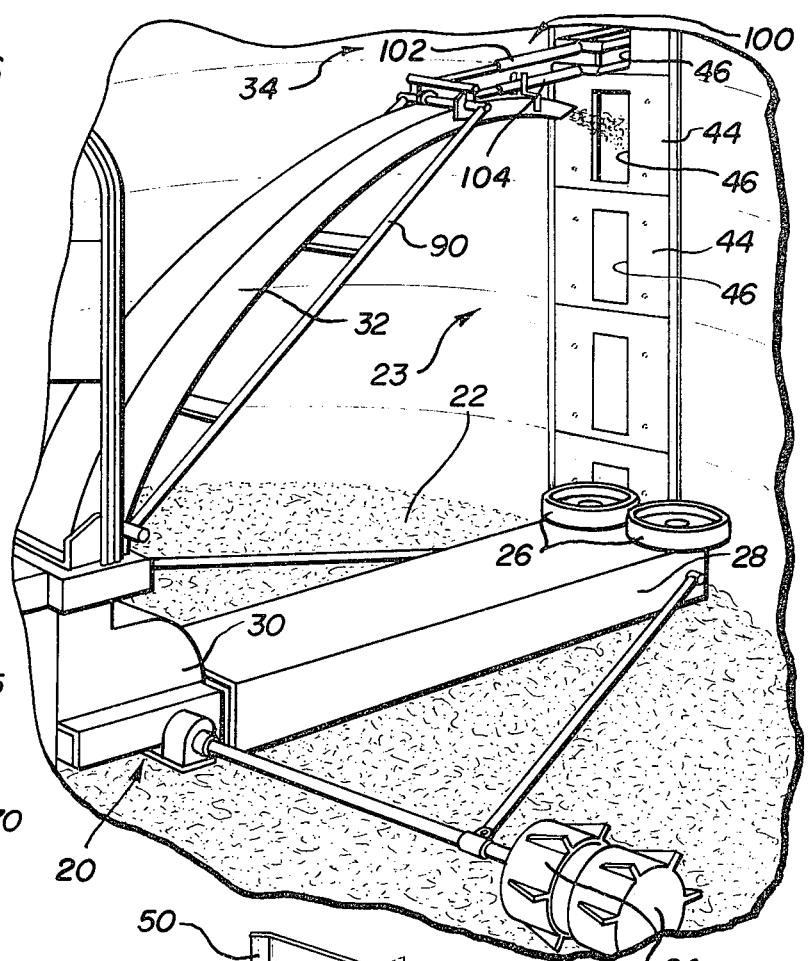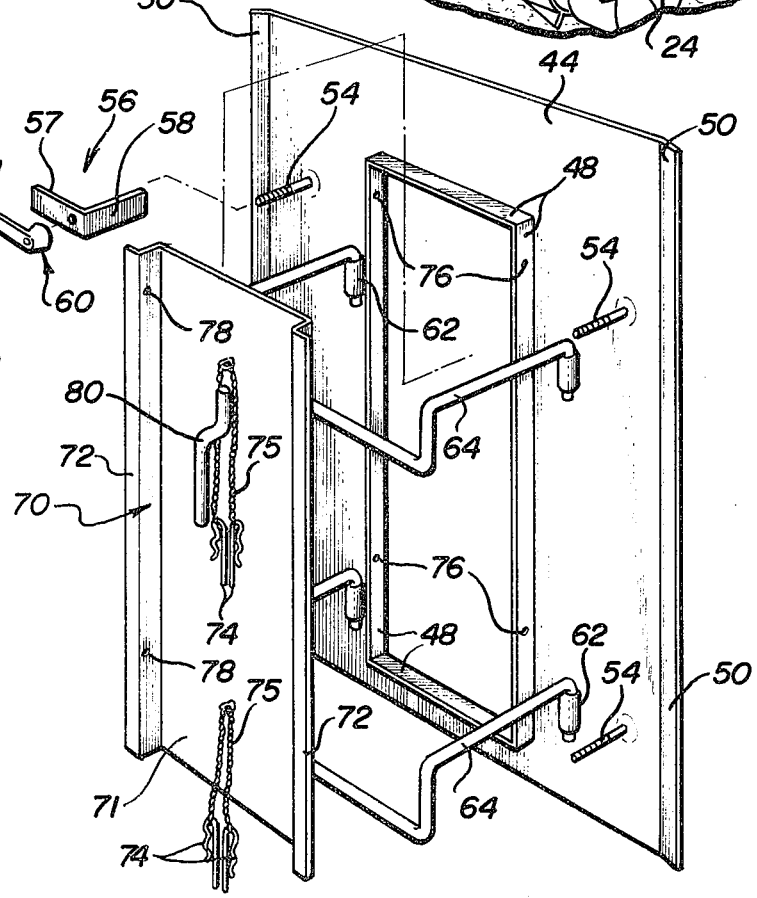

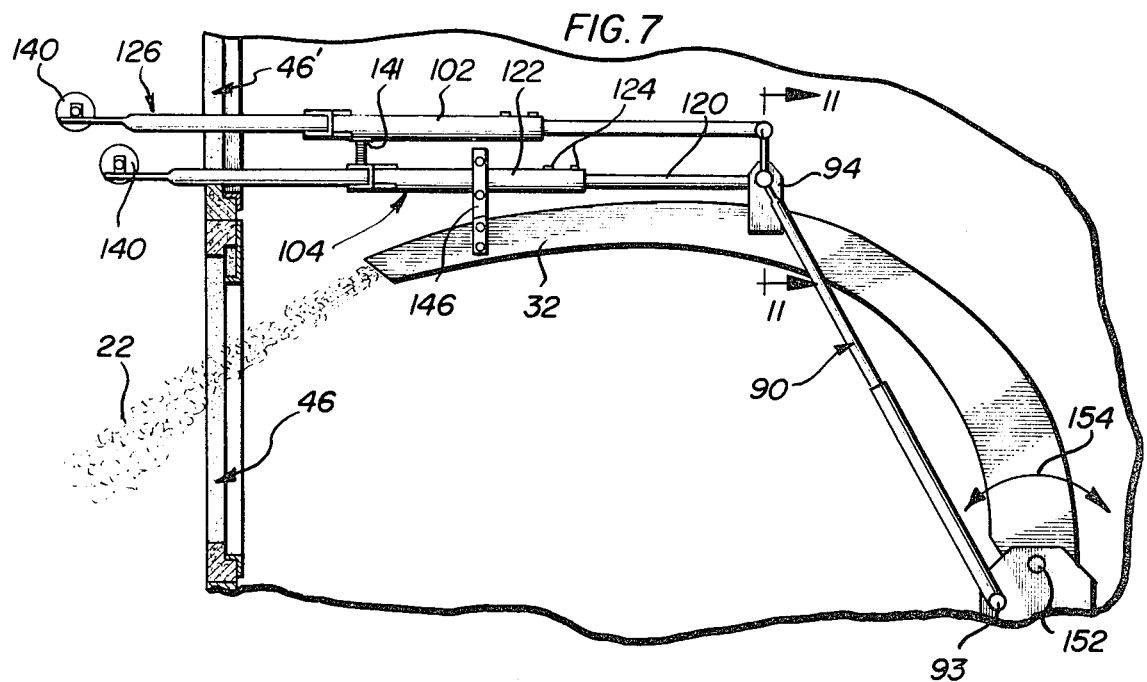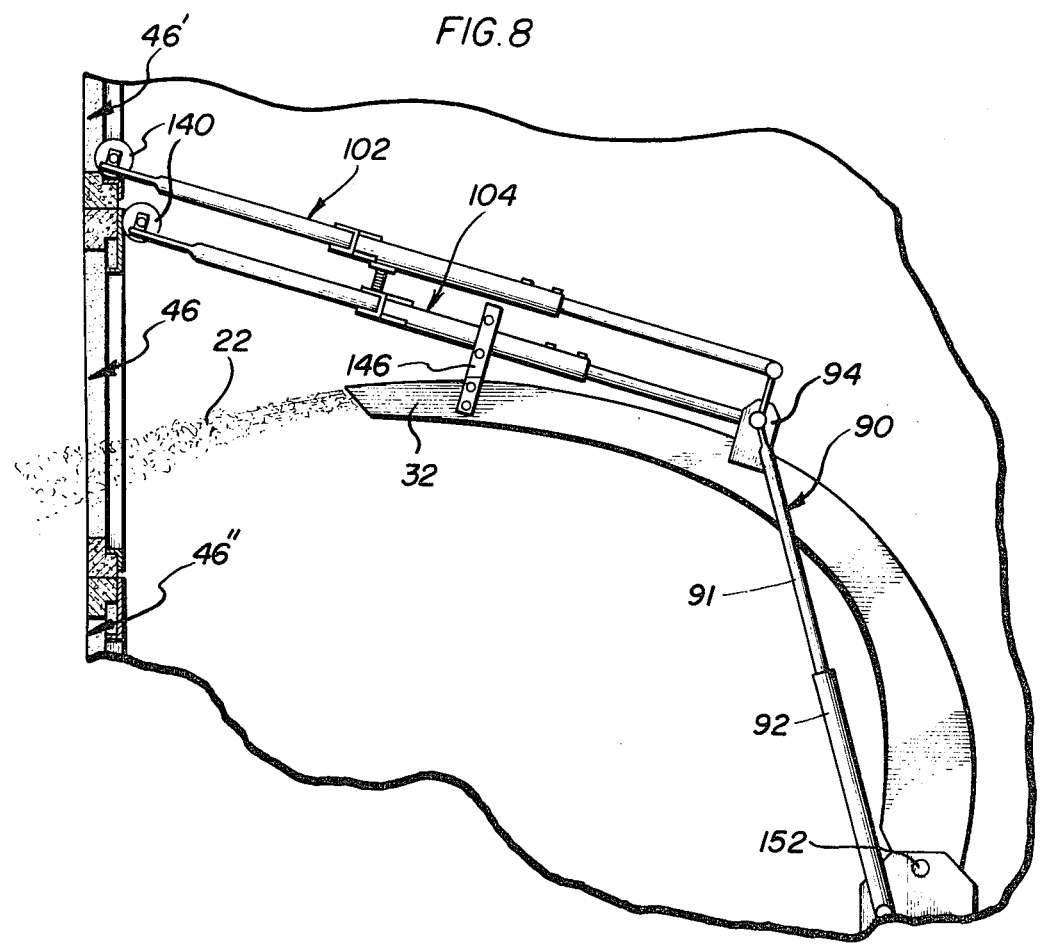

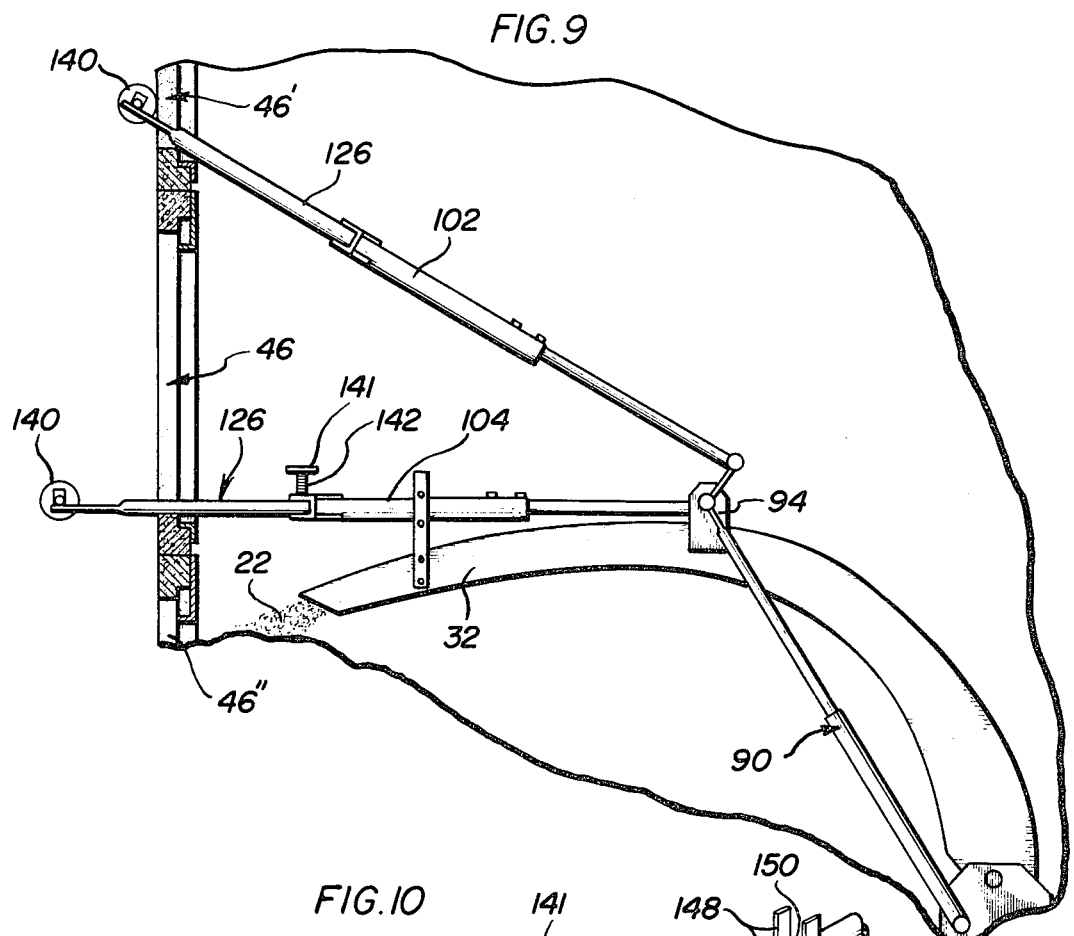
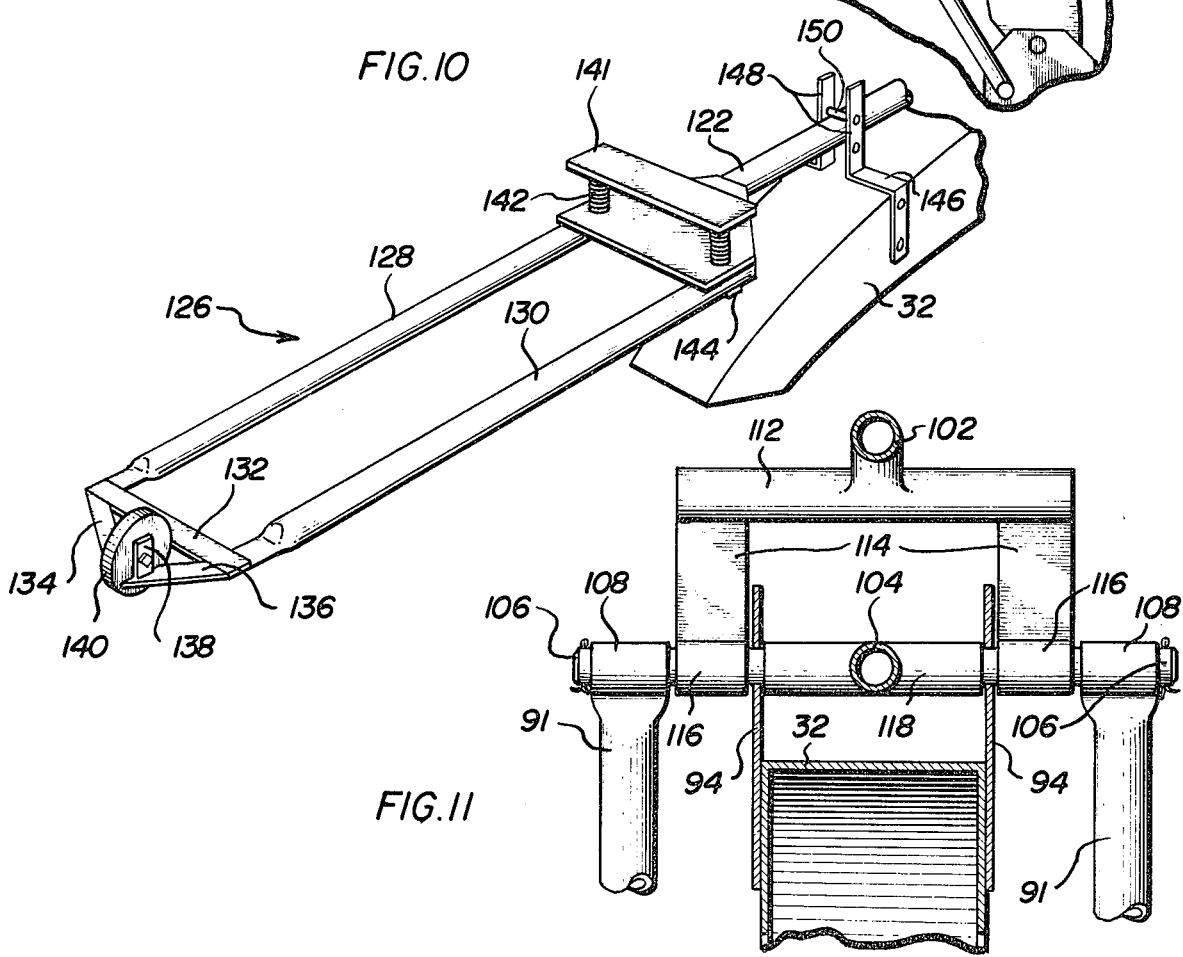

SILO DOOR CONSTRUCTION AND DISCHARGE CHUTE POSITIONING APPARATUS

BACKGROUND OF THE INVENTION

The present invention relates to silage or grain storage buildings, and more specifically to novel door structures adapted for use with automatic silage or grain unloading equipment, and improved positioning means for said unloading equipment.

Silo unloader systems are well known, and one particular system which has proved extremely successful in practice, and to which the improved positioning means this invention relates, is disclosed in U.S. Pat. No. 3,698,575, issued to R. F. Koser and J. D. Messiner, Oct. 17, 1972. Briefly, the system as disclosed in this patent, provides an unloader which rests atop the surface of the silage, and rotates to bring an auger type conveyor into engagement with the silage wherein the silage is conveyed to an impeller; from the impeller the silage is delivered to the discharge chute and expelled through openings in the silo wall, provided by a vertically extending door structure. As the silage is removed, the unloader will move downwardly in response to the decrease in the level of said silage. The auger and the impeller rotate about a vertical axis, which rotation tends to produce rotation of the discharge spout or chute which must be maintained in position in alignment with the discharge opening.

To achieve the above-discussed alignment of the discharge chute with the silo wall openings, the aforementioned U.S. patent disclosed specific positioning means. This positioning means, however, requires a specially constructed silo door structure in the wall of the silo, which structure, disclosed to some degree in the aforementioned patent, is disclosed in detail in U.S. Pat. No. 3,605,342, issued to Robert F. Koser, Sept. 20, 1971. More specifically, with the unloader positioning means as employed in the aforementioned patent, it is necessary that the silo door structure provide continuous uninterrupted, parallel inner edges which confine and engage the positioning arm as it moves downwardly from one opening to the next, said engagement being necessary to prevent undesired rotation during movement of the arm.

The requirement for specially designed discharged opening or door structure, has proved to be somewhat disadvantageous, as the above-mentioned system is not fully compatible with older, more prevalent silo constructions. This problem is overcome by the present invention, in that there is provided not only an improved silo door construction adaptable to older silos, but one that can be employed with an unloader system, with the mere addition of an improved positioning means, as will be explained.

Basically, the improved door construction enables a silo to be modified and provided with a substantially continuous inner door frame that corresponds to the curvature of the silo wall, while providing a plurality of aligned, closable discharge openings of proper size for use with unloader structures of the general type as shown in the above-mentioned patent. In this regard, the improved silo door construction of the present invention does not require installation at the time the silo is erected, although it can be employed in this manner, but rather can be used with existing silos of the stave or panel type to adapt each structure for use with automatic unloading apparatus. At this point, it should be noted that while the door system illustrated in the drawings, and to be described hereinafter, was designed primarily for use with automatic unloading equipment, its use is not so limited. In point of fact, initial testing and development work has shown that the present door system is advantageous even when automatic unloading is not contemplated.

With regard to the new improved positioning means for an unloader discharge chute, this is required due to the fact that the general design of the interior door frame is such that it merges smoothly with the inner wall of the silo. As was discussed above, the positioning means as taught by the prior art U.S. Pat. No. 3,698,575 required a special silo door frame structure. The frame structure included cross pieces upon which the positioning arm rested, and which cross pieces cooperated with vertical frame members to define a series of vertically aligned openings. The cross pieces were spaced inwardly of the parallel inner edges of the frame member, such that there was provided a substantially continuous, uninterrupted inner edges along the entire vertical length of the door frame. Accordingly, as the positioning arm moves from one cross piece to the next, incident to downward movement of the unloader, the arm is held confined by the continuous inner edges, and hopefully unwanted rotation of the discharge chute is prevented. The present invention provides novel unloading chute positioning apparatus which is not dependent upon the existence of said continuous inner edges to achieve alignment of the chute during movement of the positioning arm from one level to the next, as will be apparent from the description to follow.

As an additional factor, the positioning means of the present invention may be employed with the unloader and door frame structure as taught by the prior art. In this regard, the reliability and dependability of the overall system is improved, as the present invention insures against any likelihood that the positioning arm may become disengaged from the frame structure, during movement of the positioning arm.

DESCRIPTION OF THE DRAWINGS

With the above in mind, the present invention is illustrated as follows:

FIG. 1 is a perspective view of an overall silo design;

FIG. 2 is a partial, perspective view of the silo of FIG. 1, illustrating the door system of the present invention in place with respect to an opening formed in the silo wall;

FIG. 3 is a partial, sectional view taken along the line 3—3 of FIG. 2;

FIG. 4 is a partial, sectional view taken along the line 4—4 of FIG. 3;

FIG. 5 is an exploded, perspective view of the door assembly of the present invention;

FIG. 6 is a fragmentary view, in perspective of the interior of a silo having the door assemblies of the present invention installed therein, and also illustrating the type of unloader apparatus to which the present invention relates;

FIG. 7 is a partial, elevational view of the novel positioning means of the present invention affixed to a discharge chute, and in an initial position;

FIG. 8 is a view similar to FIG. 7, illustrating the intermediate condition wherein the unloader has descended slightly, and the lower arm thereof is about to be disposed in the next lower door opening;

FIG. 9 is a view similar to FIGS. 7 and 8 illustrating the condition after the lower arm is engaged in the adjacent opening;

FIG. 10 is a partial, perspective view of the front end of the lower arm of the positioning apparatus; and FIG. 11 is a sectional view taken along the line 11—11 of FIG. 7.

DETAILED DESCRIPTION OF THE ILLUSTRATED EMBODIMENT

Looking now to the drawings, FIG. 1 illustrates generally a typical type of silo construction. FIGS. 2-5 illustrate in detail the novel silo door system of the present invention, while FIGS. 6-11 disclose the improved unloader chute positioning means of the present invention, and how same cooperates with the door system of FIGS. 2-5 during operation. The various features shown in the drawings, will now be discussed in the general order illustrated.

In FIG. 1, there is shown a typical silo construction designated generally 10, and having a cylindrical wall configuration topped by a dome shaped roof 11. The silo 10 may be of the stave or panel type and thus includes a plurality of reinforcing hoops or bands 12 which are vertically spaced and span the circumference of the silo wall to resist the tremendous interior forces created once the structure is filled with grain or silage.

The staves or panels which form the silo wall will include one series thereof which are vertically aligned, and include wall openings 14 which are defined by various precast panel sections 15, see FIGS. 2 and 3. A silage chute 16 is affixed to the exterior of the silo in overlying relation to the openings 14 and serve to direct silage being expelled through the openings 14 downwardly.

In practice, the openings 14 are normally covered by some form of door structure which provides covered openings that enable the silo to be filled properly, and unloaded, as the grain or silage is needed. Where it is necessary to remove the silage from the silo, whether manually or by automated machinery, as discussed hereinafter, the openings in the door structure are uncovered to provide access to the discharge chute 16. As manual removal of silage was the more common method of operation employed with older silo constructions, the openings provided by the door structure on the silo wall itself were rather wide. This feature, while advantageous wherein manual unloading is encountered, renders the older silo constructions unadaptable to automated unloading apparatus of the general type as shown in the aforementioned patent, and as contemplated for use with the present invention.

In this regard, attention is briefly directed to FIG. 6, wherein the type of unloading apparatus being referred to is illustrated generally, and designated 20. The unloading apparatus 20 rests on top of the silage or other material 22 stored within the structure 10 and moves over the top surface thereof in a rotating fashion. The unloader 20, which is disclosed in more complete detail in the aforementioned U.S. Pat. No. 3,698,575, employs a drive motor (not shown) housed within the overall frame work of the unloader and operatively coupled to drive wheels 24. The drive wheels 24 engage the top surface of the silage 22 and/or the interior wall 23 of the silo, as do the guide wheels 26, and these drive wheels 24 are effective to impart rotary motion to the unloader structure.

The unloader 20, having its lower frame assembly resting upon the silage 22, includes a radially extending housing 28 in which are mounted one or more auger type conveyors (not shown) which engage the silage 22 and move the silage radially inward towards the center of rotation. The central housing 30 of the unloader 20, encloses impeller apparatus (also not shown) which receives the silage from the auger type conveyors in housing 28 and delivers said silage to the discharge chute 32. The silage moves up the discharge chute 32, and as illustrated is directed toward a discharge opening provided in the silo wall 23.

In operation, the drive wheels 24 impart movement to the lower frame portion causing the auger or auger conveyors within housing 28 to pass over the silage 22. The silage 22 is conveyed radially inwardly toward the impeller housing 30 wherein it is delivered to the discharge chute 32 and from there is expelled through the openings in the silo wall. It can be appreciated that since the lower unloader frame, which includes housing parts 30 and 28, is rotating during operation, there is also a tendency for the chute 32 to rotate, which movement must be prevented. To this end, positioning means, designated generally 34, are employed which are in the form of an arm arrangement connected to the chute 32 and engaged in the discharge opening to maintain the proper positioning of said chute. The positioning means structure and operation will be detailed with regard to FIGS. 7-11.

Attention is now directed back to FIGS. 2-5, wherein the novel door system of the present invention is disclosed in detail. As is best illustrated in FIG. 3, the silo wall is formed by a number of staves or panels 40 which interlock and which are held in position by the reinforcing hoops or bands 12. Specially fabricated panel sections 15 are used to provide the openings 14 in the silo walls. The door system of the present invention comprises a number of assemblies, designated generally 42, which overlie and cover the opening 14. In this regard, as will be discussed, the door system is designed to provide a discharge aperture, compatible with the unloading equipment of the type as discussed with regard to FIG. 6. In addition, the door assemblies 42 of the present invention are configured to merge smoothly with the interior silo wall 23, so as to present a relatively obstruction free surface which will not hinder operation of the drive and guide means of the unloader 20.

More specifically, directing attention to FIGS. 4 and 5, in conjunction with FIGS. 2 and 3, each door assembly 42 includes an inner frame panel 44 having a generally central aperture 46 which when in use, serves as the discharge opening. The aperture 46 is bounded by an outwardly extending perimeter flange 48 for a purpose to be discussed hereinafter. Also, it should be noted that the vertical outer edges of the frame panel 44 are provided with a slight break or bend thus producing biased or canted edge portions 50, also for a purpose to be discussed.

The manner of affixing the inner frame panel 44 in overlying relation to the opening 14 in the silo, is best illustrated with regard to FIGS. 3 and 5. In this regard, the inner frame panel 44 has a plurality of indentations 52, each of which accommodates the head of a threaded bolt 54; as illustrated, four such bolts are employed. An apertured, right angle clamp member 56, having leg portions 57 and 58 is disposed over each bolt 54, with the clamp member 56 being held in place by a nut 60 having a handle 61 formed thereon for manual operation.

As is best seen in FIG. 3, the leg portions 57 of the various clamp member 56 will engage the outer silo wall portion, and upon tightening of the nut 60 the canted or biased edges 50 of the interior frame panel 44 will be brought into contact with the inner wall surfaces of the silo. In this regard, the canted edge portions 50 engage the inner silo wall with a degree of resiliency, thus providing for tight clamped engagement.

As shown in FIG. 5, the inner frame panel 44 may also be provided with a number of brackets 62 which receive rung sections 64 that project outwardly of the exterior silo wall. As such, with the various door assemblies 42 in place over the aligned openings 14, the rung sections 64 provide an external ladder affording access to the upper sections of the silo.

Preferably, the aperture 46 can be closed or covered by a door element 70 with the preferred design thereof being illustrated in FIG. 5. The door section 70 includes a base panel section 71, and right angled edge flange portions 72. Accordingly, when the door 70 is in place, the base panel section 71 is received within aperture 46 and the flange portion 72 will engage the corresponding perimeter flange 48 about the aperture 46, thus limiting inward movement of the door section 70 to achieve proper placement thereof, with the base section 71 substantially filling said aperture 46, and being in alignment with the base panel 44.

To maintain the door section 70 in position, a plurality of pins 74 are provided, which pins are attached to the central section 71 by links of chain 75 or the like. Correspondingly, the flange 48 and the flange section 72 are provided with a series of mating apertures 76 and 78 which are aligned when the door section 70 is in position, the pins 74 being disposed through the aligned apertures 76 and 78 to effect locking of the door section 70 in position. To assist in positioning and removal of the door section 70, a handle 80 may be provided on the central section 71, as illustrated.

In the assembled condition of the illustrated embodiment, as shown in FIGS. 3 and 4, the lowermost portion of the flange 48 will rest upon a ledge surface 82 provided by the precast panel or stave 15, when available. This engagement of the flange 48 with the panel 15 serves to effect positioning of the inner frame panel 44 relative to the opening 14. The various door frame assemblies 42 are positioned is overlying relation to the apertures 14, such that the interior panels 44 are aligned, and provide a substantially continuous wall surface, as shown in FIG. 6, with the discharge apertures 46 being disposed one above the other.

In use, the door section 70 is fixed in place as the silo is being filled, and can be removed, as needed during the unloading operation entirely from the exterior of the silo. Thus, once the door assemblies 42 are installed and the unloading operation is commenced, there is little or no need for the farmer to enter the silo, at least insofar as removal of the door sections 70 are concerned.

As was discussed above, the silo door system as illustrated in FIGS. 2-5 was designed primarily to modify older existing silo structures for use with the type of automated silage unloading equipment as disclosed in the aforementioned U.S. patent. In this regard, it should be kept in mind that this prior unloading equipment requires employment of a rather narrow opening in which the positioning arm is engaged, so as to assure proper alignment at all times of the discharge chute with the aperture 46. Also, inner, parallel continuous edges were required to confine the positioning arm as it dropped from opening to opening. For these reasons, the older silo constructions were not compatible with this type unloading apparatus, or at least did not provide for efficient, dependable operation thereof. It should be kept in mind, however, that while the door system of the present invention was designed with the modification of existing silo constructions in mind, the system is well adapted for use with new silos as well, and provides advantages over the prior art type of construction.

Attention is now directed to the improved positioning means 34, as discussed briefly above with regard to FIG. 6. By way of review, with the unloader of the aforementioned prior art patent, a special door construction had to be employed in order to assure engagement of the positioning means at all times. With the door system of the present invention, the inner panels 44 overlie the openings 14 in the silo wall and in effect provide a smooth, continuous surface. Accordingly, the prior art type of positioning means is not adaptable to the door systems of FIGS. 2-5 as there is nothing to restrain the single positioning arm as it passes from one opening to the next, in response to lowering of the unloading apparatus. The positioning means 34 of the present invention solves this problem, and in fact provides for improved operation over that as shown in the aforementioned U.S. patent.

The basic construction of the positioning means 34 will first be discussed, and then its mode of operation or function during use will be considered. Basically, with reference to FIGS. 7-9, it should be noted that the discharge chute 32 on the unloader is mounted for pivotal movement in the vertical plane, which is necessary to accommodate lowering or downward movement of the entire unloading apparatus. The positioning means 34 includes an inner arm assembly 90, comprised of a pair of telescopically engaged tubular elements 91 and 92 pivotally connected to the base of the chute 34 at 93 and to a bracket 94 affixed to the chute 34, but spaced from the discharge end thereof. In addition, there is provided an outer arm assembly designated generally 100, which includes upper and lower arm members 102 and 104, each having an inner end associated with the bracket 94, and the outer end being free for disposition in the discharge openings 46.

With reference to FIG. 11, the manner of connecting the upper and lower arm members 102 and 104, and the inner arm assembly 90 relative to the bracket 94 is illustrated. In this regard, the bracket 94 is apertured and includes a journal pin 106 extending therethrough. The parallel elements 91 of the arm assembly 90 terminate in sleeve-like bearings 108 which are disposed over the journal pin 106. Upper arm 102 has an inner end construction which includes a cross piece 112 with a pair of downwardly extending arm segments 114, which terminate in sleeve-like bearings 116, also engaged upon journal pin 106. As to the lower arm member 104, while it need not be pivotally connected to bracket 94, in the preferred embodiment such is the case. This pivotal connection is provided by a sleeve-like bearing 118 positioned transversely of the arm 104 and journaled upon the pin 106.

Basically, the upper and lower arm members 102 and 104 are of generally similar construction, and a detailed discussion will be had only with regard to the lower arm 104, it being understood that the arm 102 if of similar design, except where noted. In this regard, the arm 104 includes a first tubular or rod-like section 120 telescopically engaged with a second, intermediate tubular section 122. The relative position of the sections 120 and 122 may be adjustably fixed by the set screws 124 which, through the telescopic engagement of the respective sections provides for adjustment of the overall length of the lower arm 104.

The forward end of the arm 104, which is designated generally 126, is illustrated in FIG. 10, and is of a generally rectangular construction. In this regard, the end 126 is defined by a pair of parallel sections 128 and 130 joined at their outer ends by a cross brace 132. A pair of converging end sections 134 and 136 extend from the cross brace 132 and include upstanding flanges 138. A roller member 140 is journaled to the flange 138, for a purpose to be explained hereinafter.

In addition, the lower arm member 104, unlike the upper arm 102, includes a resilient mounted stop member 141 upon which the upper arm 102 rests. The stop member 141 serves to maintain the spacing of the arm members 102 and 104 and also provides a cushioning effect during operation as will be explained. The mounting of the stop member 141 is achieved by the employment of springs 142 which surround downwardly projecting pins (not shown) attached to a lower limit plate 144. As the springs will bias the stop or plate member 141 to the position as shown, but will provide the necessary resiliency required to absorb the shock resulting when the upper arm 102 is brought into engagement therewith.

Further, with reference to FIGS. 10, it should be noted that the discharge chute 32 includes an additional bracket assembly 146 which serves to confine and limit movement of the lower assembly 104. The assembly 146 is comprised of a pair of upstanding sections 148 disposed on opposite sides of the tubular section 122, with a pin 150 engaged therethrough and overlying the tubular section 122. As such, only slight relative movement can take place between the lower arm 104 and chute 32 before the chute will move with said arm. The purpose for this will become clear from the description of the operation of the positioning means 34, to follow with regard to FIGS. 7-9.

For purposes of describing the operation of the novel positioning means 34, the condition as shown in FIG. 7 will be considered as the initial position. In this regard, it should be noted that the upper arm assembly 102 is at rest upon the support plate 141, thus spacing the respective arm members. Also, the length of the arm assembly 102 is adjusted so that it is slightly greater than that of the lower arm assembly 104, with the end section 126 of each extending through the discharge aperture 46'.

In the condition as shown in FIG. 7, the chute 32 is aligned with the discharge aperture 46, (that immediately below aperture 46') with silage being expelled through said aperture, into the vertical chute 16 (not shown).

Keeping in mind the prior discussion as to the operation of the unloader 20, the lower frame assembly thereof will rotate relative to chute 32, continuously delivering silage 22 to chute 32 and lowering the level of said silage 22. As the silage level drops, the discharge chute 32 will remain substantially fixed relative to the positioning arm assembly 34, which is achieved by a pivoting of the chute 32 about the point 152, FIG. 7, as indicated by the arrow 154.

It can be appreciated, that upon lowering of the unloader 20, it is only a matter of time before the upper and lower arm members 102 and 104 become disengaged from the discharge aperture 46'. However, with the positioning arrangement 34, this disengagement takes place sequentially, so that one or the other of the arm members 102 or 104 is always engaged in a discharge aperture, be it aperture 46 or 46'.

Looking now to FIG. 8, as the unloader 20 moves downwardly, the lower arm 104 will become disengaged from aperture 46', with the roller 140 facilitating movement. However, as the upper arm 102 is longer, and is free to pivot relative to lower arm member 104, it will remain engaged in aperture 46' to maintain the proper alignment of the discharge chute 32 with aperture 46. This is the case, even though the end section 146 of lower arm 104 is completely disengaged from aperture 46', with the roller 140 resting upon and moving over the inner surface of the associated panel section 44.

Once the roller 140 reaches the aperture 46, there is nothing to restrain pivotal movement of the chute 32, and both said chute 32 and the positioning arm assembly 34 will move in a counter-clockwise direction about pivot point 152, thus thrusting the end portion 126 of the upper and lower arm assemblies 102 and 104 outwardly of the respective apertures 46 and 46', as shown in FIG. 9. This pivotal movement will bring the discharge chute 32 into operative alignment with the next lowermost aperture 46", also as shown in FIG. 9.

With reference to FIG. 9, after this condition is achieved, the continued lowering of the unloader 20 will ultimately result in the end section 126 of upper arm 102 moving out of aperture 46', down the inner surface of the door assemblies 42, and into aperture 46. Once the roller 140 on the end of the upper arm 102 reaches aperture 46, there is nothing restraining the upper arm assembly, and it will pivot under its own weight about the bracket 94 until it engages the stop 141 with the resilient mounting discussed previously, absorbing the shock of said engagement.

With both the upper and lower arm assemblies engaged in aperture 46, the approximate condition as shown in FIG. 7 will be reattained, however, the unloader 20 and the chute 32 may be at slightly altered positions. As such, the double arm positioning means 34 will continue to function as described, always maintaining the alignment of chute 32 with the discharge aperture 46.

There is thus disclosed a novel silo door system which is capable of adapting existing silo construction for use with automatic unloading apparatus of the general type illustrated. In addition, the present invention provides novel positioning means for use with the silo door system, as disclosed, or others which provides for dependable, reliable operation of said unloader apparatus.

The present invention has been illustrated and described with regard to a preferred embodiment. It is understood, and even envisioned that those skilled in the art and possessed of the present disclosure will derive various modifications without departing from the spirit and scope of the invention, as defined in the claims appended hereto.

The invention is claimed as follows:

1. In combination, a silo door system and automatic lowering silo unloader apparatus, said door system including a plurality of frame panel sections positioned in engagement with the interior wall of said silo in overlying relation to an elongate vertical opening or openings formed in the silo walls, each said frame panel section including an aperture bounded by upper, lower and side panel portions such that when in position, said upper and lower panel portions of adjacent frame sections cooperate to define a series of vertical cross frame portions and said unloader apparatus being of the type adapted to rest upon the top of the material in the silo and be lowered automatically in response to the discharge of silage, said unloader apparatus including a pivotal discharge chute which must be maintained in alignment with the apertures provided by said frame panel sections, and positioning means for said chute, said positioning means comprising upper and lower, spaced apart arm members, mounted upon said discharge chute, said upper arm member being pivotally mounted relative to said chute and said lower arm member while the degree of movement between said lower arm member and said chute is limited, said upper and lower arm members each including an end portion for disposition through said panel section apertures, such that when so disposed they are adapted to rest upon the cross frame portions provided by said frame panel sections and serve to maintain the discharge chute in alignment with said panel section apertures, the pivoted connection of said upper arm, enabling said arm to be maintained in a discharge opening above that in which said lower arm is engaged, such as the unloader with the discharge chute moves downwardly, one of said arms will, at all times, be engaged in a discharge opening, thereby maintaining the chute in position, and precluding undesired rotation thereof, and roller means on the end portion of each said arm member to facilitate passage of said arm member from one aperture to the next.

2. In combination, a silo door system and automatic lowering silo unloader apparatus, said door system including a plurality of frame panel sections positioned in engagement with the interior wall of said silo in overlying relation to an elongate vertical opening or openings formed in the silo wall, each said frame panel section including an aperture bounded by upper, lower and side panel portions such that when in position, said upper and lower panel portions of adjacent frame sections cooperate to define a series of vertical cross frame portions and said unloader apparatus being of the type adapted to rest upon the top of the material in the silo and be lowered automatically in response to the discharge of silage, said unloader apparatus including a pivotal discharge chute which must be maintained in alignment with the apertures provided by said frame panel sections, and positioning means for said chute, said positioning means comprising upper and lower, spaced apart arm members, mounted upon said discharge chute, said upper arm member being pivotally mounted relative to said chute and said lower arm member while the degree of movement between said lower arm member and said chute is limited, said lower arm member including stop means upon which said upper arm rests to maintain said spaced relation, and said upper and lower arm members each including an end portion for disposition through said panel section apertures, such that when so disposed they are adapted to rest upon the cross frame portions provided by said frame panel sections and serve to maintain the discharge chute in alignment with said panel section apertures, the pivoted connection of said upper arm, enabling said arm to be maintained in a discharge opening above that in which said lower arm is engaged, such as the unloader with the discharge chute moves downwardly, one of said arms will, at all times, be engaged in a discharge opening, thereby maintaining the chute in position, and precluding undesired rotation thereof.

3. The combination of claim 2 wherein said stop means is spring biased.

4. Silo unloader discharge chute positioning apparatus, for use with a silo unloader of the type employed with silos having a plurality of vertically arranged discharge openings, said unloader being of the general type which rests upon the silage and moves downwardly in response to the discharge of silage material from the silo, and includes a pivotally mounted discharge chute that must be maintained in alignment with said discharge openings, said positioning apparatus including: upper and lower arm members affixed to said chute, at least said upper arm member being pivotally mounted relative to said chute and said lower arm member, said lower arm member being associated with said chute for only limited movement and thereafter said lower arm member and said chute moving together, the free ends of said upper and lower arm members adapted to be disposed through the discharge openings in said silo wall, such that when so disposed they serve to maintain the discharge chute in alignment with said openings, the pivoted connection of said upper arm, enabling said arm member to be maintained in a discharge opening above that in which said lower arm is engaged, and position limiting means carried by one of said arm members to maintain said arm members in spaced relation, said position limiting means being spring biased, whereby as the unloader with the discharge chute moves downwardly, one of said arms will at all times be engaged in a discharge opening, thereby maintaining the chute in position, and precluding undesired rotation thereof.

5. Positioning apparatus as defined in claim 4, wherein there is included bracket means to limit the relative movement between said lower arm and said chute.

6. Silo unloader discharge chute positioning apparatus, for use with a silo unloader of the type employed with silos having a plurality of vertically arranged discharge openings, said unloader being of the general type which rests upon the silage and moves downwardly in response to the discharge of silage material from the silo, and includes a pivotally mounted discharge chute that must be maintained in alignment with said discharge openings, said positioning apparatus including: upper and lower arm members affixed to said chute, at least said upper arm member being pivotally mounted relative to said chute and said lower arm members, said lower arm member being associated with said chute for only limited movement and thereafter said lower arm member and said chute moving together, the free ends of said upper and lower arm members adapted to be disposed through the discharge openings in said silo wall, and each said free end including roller means for engagement with the silo wall to facilitate movement of said arms from opening to opening as the unloader moves downwardly relative to the discharge openings, such that when said arm members are so disposed they serve to maintain the discharge chute in alignment with said openings, the pivoted connection of said second upper arm, enabling said arm to be maintained in a discharge opening above that in which said first arm is engaged, such as the unloader with the discharge chute moves downwardly, one of said arms will at all times be engaged in a discharge opening, thereby maintaining the chute in position, and precluding undesired rotation thereof.

7. In combination, a silo unloader and unloader discharge chute positioning means for use with a silo providing a series of vertically aligned discharge apertures, or the like, said unloader adapted to rest upon the material within the silo and to descend automatically in response to the discharge of material, said unloader including a pivotally mounted discharge chute which must be maintained in alignment with the discharge provided by said silo; and positioning means for said chute, said positioning means comprising upper and lower, spaced apart arm members, mounted upon said discharge chute, said upper arm member being pivotally mounted relative to said chute, while said lower arm member and said chute are coupled for a degree of joint movement, said upper and lower arm members each including an end portion for disposition through said discharge apertures, such that when so disposed they are adapted to rest upon the structure defining said apertures, each said end portion including roller means to facilitate passage of said arm members from one aperture to the next as the unloader moves downwardly, such that said arm members are adapted to maintain the discharge chute in alignment with said openings, the pivoted connection of said upper arm, enabling said arm to be maintained in a discharge aperture above that in which said lower arm is engaged, such as the unloader with the discharge chute moves downwardly, one of said arms will, at all times, be engaged in a discharge aperture, thereby maintaining the chute in position, and precluding undesired rotation thereof.

* * * * *